May 31, 1938. V. F. BAUMGARDNER 2,119,263
HITCH MEANS
Filed Dec. 27, 1937
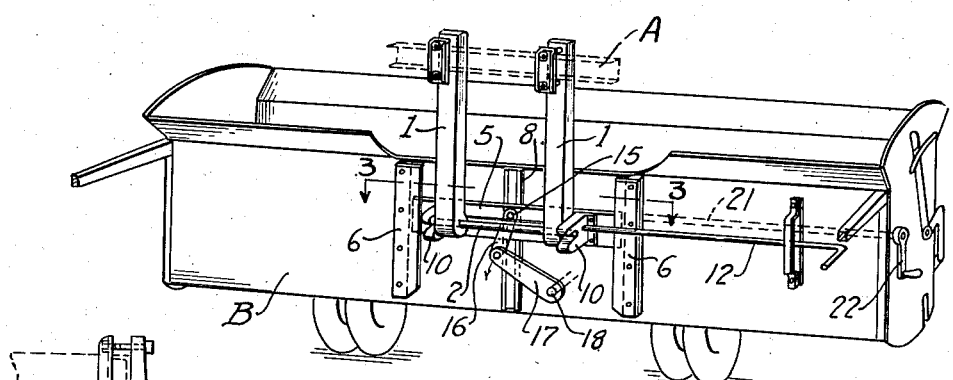
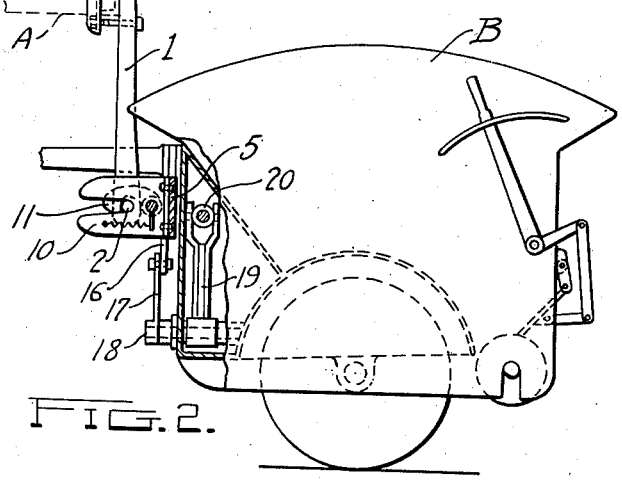
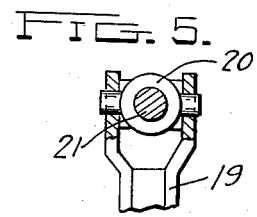
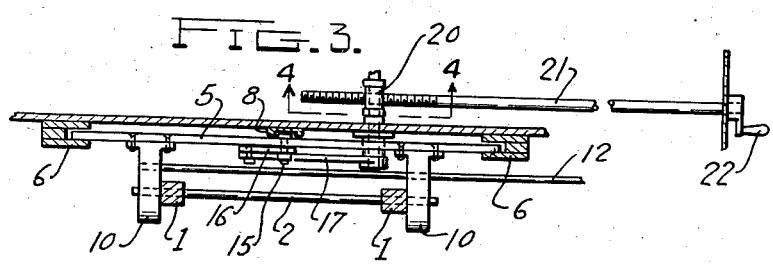
INVENTOR
Versal Forrest Baumgardner
BY *Owen & Owen*
ATTORNEYS.

Patented May 31, 1938

2,119,263

UNITED STATES PATENT OFFICE 2,119,263

HITCH MEANS

Versal Forrest Baumgardner, Celina, Ohio

Application December 27, 1937, Serial No. 181,726

3 Claims. (Cl. 280—33.10)

This invention relates to hitch means for releasably connecting trailer attachments, for instance a surface material spreading machine, to vehicles, and has primarily for its object the provision of improvements in the hitch means shown in my prior U. S. Letters Patent No. 2,050,518, whereby the hitch parts are vertically adjustable in an easy and simple manner from a side of the attachment to permit such parts to be raised or lowered to suit the position of the cooperating interengaging vehicle member and to permit the level position of the attachment to be maintained.

The invention is fully described in the following specification, and a preferred embodiment thereof illustrated in the accompanying drawing, in which—

Figure 1 is a perspective elevation of an attachment embodying the invention operatively connected to a spreading machine; Fig. 2 is an enlarged end elevation thereof, with a part broken away; Fig. 3 is an enlarged fragmentary section on the line 3—3 in Fig. 1; Fig. 4 is an enlarged section on the line 4—4 in Fig. 3, and Fig. 5 is a section on the line 5—5 in Fig. 4, with parts broken away.

Referring to the drawing, A designates, in dotted lines, a truck frame, or the like, and B a machine attached thereto and of the type, in the present instance, for spreading a road surfacing material.

The hitch means comprising the illustrated embodiment of the invention includes two vertically disposed arms 1 fixedly attached to and depending from an end cross member of the truck frame A in horizontally spaced position and connected at their free ends by a cross-bar 2, the ends of which project beyond the respective arms to form trunnions.

Attached to the end of the machine B, which is to be attached to the truck, is a cross member 5, in the present instance, of elongated flat plate form, said member having its ends mounted in guides 6 for vertical sliding movements. Fixedly attached to the cross member 5 and projecting outwardly therefrom away from the machine B are a pair of fork members 10 spaced lengthwise of the member 5 and adapted to receive the respective end trunnions of the cross-bar 2 in their forks, as shown in Fig. 1. Each fork member 10 is provided with a hook-form of pawl 11 for releasably engaging the cross-bar 2 and retaining it within the fork members 10, as described in my said former Letters Patent. A control shaft 12 is provided for the pawls 11.

It is apparent that a forward movement of the truck A imparts a forward pull on the cross member 5 through the engagement of the cross-bar 2 with the fork members 10, and that a pull of the cross member 5 is applied to the machine B through the guides 6, and also that a relative rocking of the truck A and machine B is compensated for by the vertical rocking of the cross member 5 in the guide 6.

For the purpose of the present invention, the cross member 5 is carried for vertical rocking movements by a centrally disposed pivot 15 which extends forwardly and rearwardly through the cross member and has its rear end enlarged or headed to have vertical movements in a grooved guide-bar 8 attached to the front end of the machine B centrally between the two guides 6. The outer end of the pivot 15 has a link 16 projecting downwardly therefrom and pivotally connected to a rocker arm 17 projecting from the forward end of a shaft 18 journaled in the machine frame B below the cross member 5 and extending forwardly and rearwardly of the machine. A rocker arm 19 fixedly rises from an inner end portion of the shaft 18 within a portion of the machine B and carries at its upper end a swivel nut 20 threaded on a control shaft 21. This shaft is suitably journaled in the frame of the machine B and projects outwardly from one side of such machine in convenient reach of an operator, and carries an operating crank 22 at such end.

It is apparent that a turning of the crank 22 and shaft 21 will impart a rocking movement to the rocker arm 19 due to the threaded engagement of the nut 20 and shaft 21, thereby rocking the shaft 18 which in turn will effect a movement of the toggle links 16, 17, to effect a raising or lowering of the cross member 5 depending on the direction of turning of the shaft 21. An easy and quick vertical adjustment of the member 5 may be effected so as to position the fork members 10 to suit the position of the engaging cross-bar 2 of the truck. It will be understood that the vertical position of the cross-bar 2 varies with the load in the truck, so that it raises as such load is discharged into the machine B.

It is desirable in practice to maintain the machine B in level position, inasmuch as it operates best in such position, and it is therefore important to provide a means which is easily operable during the material spreading operation to adjust the position of the hitch means on the machine to suit the position of the cross-bar 2 of the truck.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a hitch device of the class described, a cross member carried by an apparatus to be towed for vertical pivotal and vertical reciprocatory movements, a pull on such member exerting a pull on the apparatus, means fixed to the apparatus to be towed and guiding the movements of said member, means operable to impart vertical adjustment to said member, said adjusting means including a screw control shaft disposed rearwardly of said member, a second shaft projecting forwardly across the vertical plane of said member, connection between said screw shaft and second shaft to impart predetermined rotation to the second shaft when the screw shaft is turned, and a toggle connection between said second shaft and said member in advance of the member, whereby rotation of the second shaft imparts vertical adjusting movements to the member and permits vertical pivotal movements of the member.

2. In a hitch device of the class described, the combination with an apparatus to be towed, a cross member carried by said apparatus for vertical pivotal and vertical reciprocatory movements, a pull on such member exerting a pull on such apparatus, means carried by the apparatus for guiding the pivotal and reciprocatory movements of said member, said guide means including a vertical guide disposed substantially centrally of the horizontal length of said member, a pivot projecting through said member and cooperating with said vertical guide to guide the adjusting movements of said member, and control means carried by said apparatus and operable to impart vertical adjustment to said member, said control means being disposed partly at the rear of and partly in advance of said member and being connected to said pivot.

3. In a hitch device of the class described, the combination with an apparatus to be towed, a cross member carried by said apparatus for vertical pivotal and vertical reciprocatory movements, a pull on such member exerting a pull on such apparatus, means carried by the apparatus for guiding the pivotal and reciprocatory movements of said member, said guide means including a vertical guide disposed substantially centrally of the horizontal length of said member, a pivot projecting through said member and cooperating with said vertical guide to guide the adjusting movements of said member, and control means carried by said apparatus and operable to impart vertical adjustment to said member, said control means including a screw control shaft disposed rearwardly of said member, a second shaft extending forwardly and rearwardly with respect to said member and having connection at its rear end with the shaft, whereby a turning of the screw shaft imparts rotary movement to said second shaft, and a toggle link connection between said second shaft and pivot in advance of said member to impart vertical adjustment to the pivot and member when the second shaft is rotated.

VERSAL FORREST BAUMGARDNER.